Dec. 13, 1949 R. S. HOLMES 2,491,450
RADIO PULSE-ECHO LOCATOR SYSTEM TO DISTINGUISH
BETWEEN MOVING AND STATIONARY OBJECTS
Filed Feb. 24, 1944 2 Sheets-Sheet 1
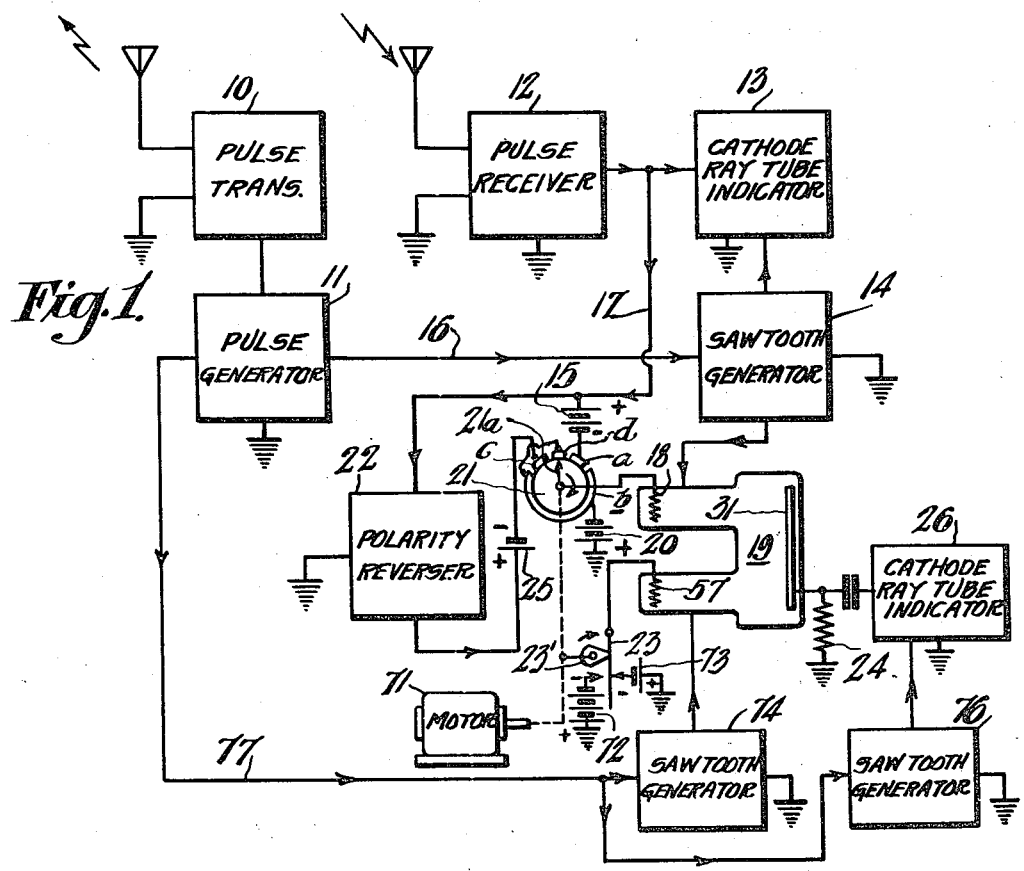
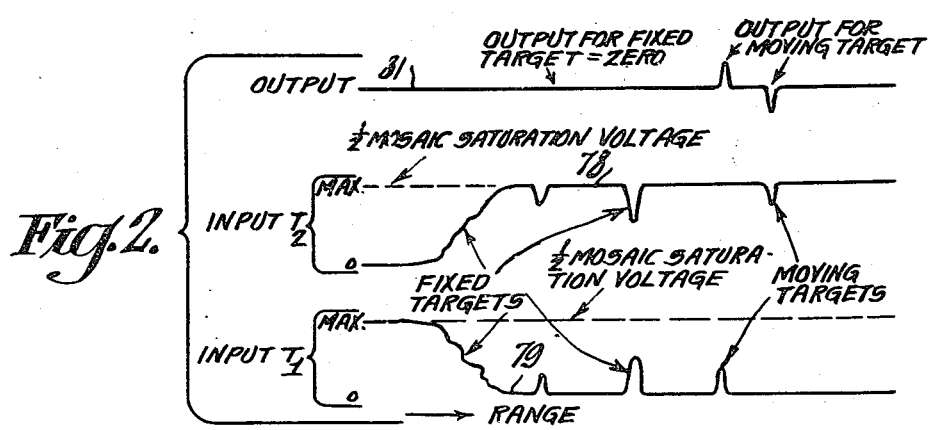
INVENTOR.
Ralph S. Holmes
BY
ATTORNEY

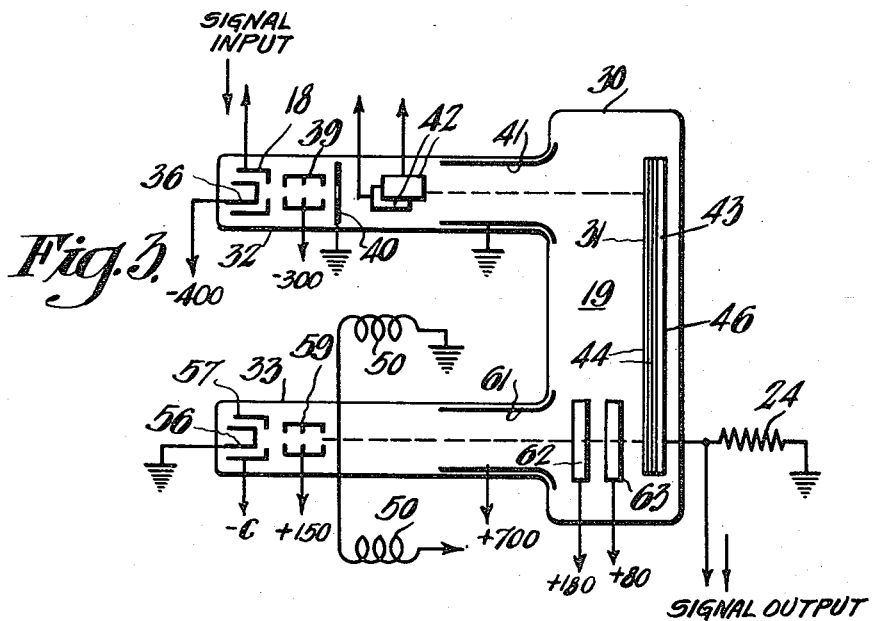
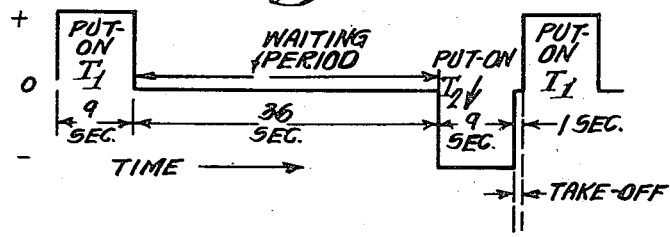

Patented Dec. 13, 1949

2,491,450

UNITED STATES PATENT OFFICE 2,491,450

RADIO PULSE-ECHO LOCATOR SYSTEM TO DISTINGUISH BETWEEN MOVING AND STATIONARY OBJECTS

Ralph S. Holmes, Princeton, N. J., assignor to Radio Corporation of America, a corporation of Delaware Application February 24, 1944, Serial No. 523,743

9 Claims. (Cl. 343—8)

My invention relates to pulse-echo locator and distance determining systems and particularly to systems of this type designed for detecting and locating moving objects or targets such as approaching aircraft.

One of the difficulties in locating an approaching aircraft, for example, is that many echo pulses are received as a result of reflection from stationary objects such as buildings, hills, etc. which tend to mask or obscure the pulses reflected from the aircraft. This is particularly true if the aircraft is flying at a low altitude. Because of this masking effect of undesired reflected pulses, the effective range of the pulse-echo system is less than it would be otherwise.

An object of the present invention is to provide for a pulse-echo system an improved method of and means for reducing the masking or obscuring effect of pulses reflected from stationary objects.

A further object of the invention is to provide an improved radio locator system.

A still further object of the invention is to provide improved radio locator receiving means for locating moving targets.

In one preferred embodiment of the invention the system may include a pulse transmitter and a pulse receiver of the type commonly employed in pulse-echo locator systems. In accordance with the present invention, the receiving means also comprises a storage tube or the like by means of which received pulses may be stored and then taken off at a later interval. The storage tube includes a storage screen comprising a plurality of capacity elements. Switching means are provided by means of which received signals are first applied with a certain polarity to the storage tube for an interval $T_1$ of a few seconds, for example, and then, after a waiting interval during which no signals are applied, are again applied to the storage tube with reversed polarity for an interval $T_2$, preferably of the same duration as the first interval.

During the interval $T_1$, charges will build up on each storage screen element in proportion to the strength of the echoes present at the range corresponding to that element. During the interval $T_2$, the charge on each element will build up in inverse proportion to the signal present at that range. The resulting stored signals are then taken off the storage tube for operating an indicating device and the cycle is repeated. As will be explained hereinafter, the signals that have been reflected from stationary objects are balanced out in the storage tube so that the only signals that appear in the storage tube output are those from moving targets that have changed their location substantially during the above-mentioned "waiting period."

The invention will be better understood from the following description taken in connection with the accompanying drawing in which Figure 1 is a block and circuit diagram of one embodiment of the invention, Figure 2 is a group of graphs that are referred to in explaining the operation of the system of Fig. 1, Figure 3 is a view of a storage tube of the type that may be employed in the system of Fig. 1, and Figure 4 is a graph showing the switching sequence for the storage tube in the system of Fig. 1.

Fig. 1 shows a pulse-echo system comprising a radio pulse transmitter 10 which is modulated by the pulses from a pulse generator 11 whereby pulses of radio energy are radiated toward reflecting objects or targets to be located. After reflection from a target, the pulses are received and demodulated by a receiver 12 and supplied to a conventional cathode-ray tube indicator represented by the block 13. Cathode ray deflection for the indicator 13 is provided by a sawtooth wave generator 14 which is synchronized by pulses supplied over a line 16 from the pulse generator 11. The system of Fig. 1 described thus far is conventional.

According to a preferred embodiment of the present invention the output of the receiver 12 is also supplied over a conductor 17 to the "put-on" beam control electrode or grid 18 of a cathode-ray storage tube 19. By means of a switch 21 and a polarity reverser tube 22, the received pulses are applied to the grid 18 first with one polarity and then, after a waiting interval, with the opposite polarity. Next, the closing of a cam-operated switch 23 causes the stored signal to be taken off and supplied through an output resistor 24 to a second cathode-ray tube indicator 26. This cycle of "put-on," "wait," "reverse put-on," and "take-off" is illustrated in Fig. 4. Fig. 2 illustrates how this cycle of operation causes all the stored signal to balance out except for the signal obtained from a moving target.

Before describing the circuit and circuit operation more in detail, reference will be made to Fig. 3 which illustrates one suitable design for the storage tube 19, which is described and claimed in application Serial No. 492,658, filed June 26, 1943, as the joint invention of Harley Iams, Albert Rose and Gardner L. Krieger, now Patent 2,454,652, issued November 23, 1948, and entitled Cathode ray storage tube. The tube 19 comprises a highly evacuated envelope having a bulb portion 30, in which a storage screen 31 is mounted, and having two neck portions 32 and 33 in which are mounted a high velocity beam "put-on" gun and a low velocity "take-off" gun, respectively.

The high velocity and low velocity electron guns may be of well known types such as those employed in the high velocity beam and low velocity beam television pick-up tubes known as the Iconoscope and the Orthicon, respectively. In the example illustrated, the high velocity gun comprises a cathode 36, the control grid 18, a first anode 39 and a second anode 40. A collector electrode 41 is provided to collect secondary electrons from the storage screen 31. Vertical deflection of the "put-on" beam may be produced by means of a pair of deflecting plates 42. Operating voltages that may be applied to the various tube electrodes are indicated on the drawing merely by way of example.

The storage screen 31 may be constructed in various ways. One of the preferred constructions comprises a supporting sheet of mica 43 about 0.001 inch thick which has conducting strips or lines 44 extending horizontally across its front surface. The strips 44 may be formed, for example, by sputtering a conducting coating of platinum upon each side of the mica sheet and then scratching about 100 lines to the inch on the front or scanned side with a ruling machine to separate the metal into conducting lines. The metal coating 46 on the back side of the mica sheet is used, in the example illustrated, as the signal plate for taking off the signal through the output resistor 24.

During the processing of the tube, the screen 31 preferably has silver evaporated thereon to make the secondary emission uniform over the whole line surface. The amount of silver introduced is too small to make the space between the line 44 conducting. A small amount of caesium may also be introduced into the tube during the processing to make sure that the ratio of secondary electrons to primary electrons is greater than unity. Since it is preferred that the screen 31 shall not be photoelectric, no oxidizing step preceding the introduction of caesium is required, as would be the case in processing a mosaic screen for an Iconoscope.

The screen 31, when mounted in the tube, preferably is curved to conform to the surface of a cylinder having an axis that passes through or near the centers of deflection of the two electron beams whereby the point of smallest beam diameter is always at the screen surface as the beam is deflected and whereby the beams during deflection are substantially at right angles to the screen surface where the beam strikes. The latter feature is important in the operation with a low velocity beam.

In operation, the signal applied to the control electrode 18 modulates the intensity of the high velocity beam as it is deflected vertically across the conducting strips. The number of secondary electrons liberated from the strips exceeds the number of beam electrons and, since substantially all of the secondary electrons are drawn over to the collector electrode 41, they are not redistributed over the screen 31. Hence, the bombarded strips 44 are given a more positive potential.

At the other end of the screen 31 the conducting strips 44 are scanned during the "take-off" period (Fig. 4) by deflecting the low velocity beam vertically and across the strips 44 by means of deflecting coils 50, for example. Except during the "take-off" period, the low velocity beam is blocked by a high negative bias on the control grid 57. When the strips 44 are scanned by the low velocity beam, the electrons of the beam strike the conducting strips 44 with a velocity so that the ratio of secondary electrons to primary or beam electrons is less than unity. According to one method of operation, sufficient beam current is provided to return the conducting lines 44 to the potential of the cathode 56 of the low velocity beam gun. Thus the signal put on by the first beam is substantially completely "wiped off" by a single scanning of the second beam. It may be preferred to operate the tube with a low velocity beam of less current density so that the beam removes only part of the stored signal as it scans once across the screen, but completely "wipes off" the stored signal during the several scannings that occur during the "take-off" period.

In the example illustrated, the low velocity beam electron gun comprises the cathode 56, the control electrode 57, a first anode 59 and a second anode 61. Two frame-like or ring electrodes 62 and 63 are positioned between the second anode 61 and the screen 31 for slowing down the electrons after they leave the region of the second anode 61.

Referring again to the circuit of Fig. 1, the switch arm 21a and the switch arm 23 (which is actuated by a cam 23') are driven in a fixed time relation by a motor 71. The time relation of the several switch positions will be apparent from Fig. 4, the switch arm 21a being in contact with a commutator segment $a$ during the first "put-on" interval $T_1$, in contact with a commutator segment $b$ during the "waiting" period, in contact with a commutator segment $c$ during the second "put-on" interval $T_2$, and in contact with a commutator segment $d$ during the "take-off" period.

During the "put-on" interval $T_1$ the "put-on" beam is biased substantially to cut-off or minimum current value by means of a biasing source such as a battery 15. Thus, the charge on the capacity or mosaic elements of the screen 31 at a particular point on the screen is increased from zero or nearly zero value by any reflected signal received during the period $T_1$ as shown by the graph 79. During the waiting interval, also, the "put-on" beam is biased to cut-off by means of a battery 20 whereby there is no change in the charge on the elements of screen 31 during the waiting period.

It may be noted that the left-hand portions of the graphs 78 and 79 corresponding to distances near the transmitter and receiver represent a condition where the receiver amplifier is overloaded by the strong echoes from the ground and nearby objects.

During the next "put-on" period $T_2$, a bias is applied from a battery 25 to make the "put-on" beam current of such value as to charge the capacity elements of the screen 31 to about one-half their maximum charge in the absence of a receiving signal. The maximum charge referred to is the maximum assuming linear operation of the storage tube, that is, operation where control grid voltage vs. charge on the mosaic or capacity elements of the screen 31 is linear. During the period $T_2$, a received signal causes less charge to be put on the mosaic elements at a particular point on the screen as shown by graph 78.

During the "take-off" period, the "put-on" beam is again biased to cut-off by the battery 20 whereby the charges on the elements of the screen 31 are affected only during the two "put-on" intervals $T_1$ and $T_2$.

At the start of the "take-off" interval, the switch arm 23 is moved from its left-hand position of high negative bias to its right-hand position of low negative bias whereby the "take-off" beam is unblocked and remains unblocked during the "take-off" interval. As shown in Fig. 4, the "take-off" interval may be of comparatively short duration. The high negative bias for blocking the take-off beam at the end of the "take-off" interval may be provided by a battery 72 and the bias for take-off beam operation may be provided by a battery 73.

Sawtooth generators 74 and 76 are provided for deflecting the take-off beam of the storage tube and the cathode ray or beam of the indicator tube 26 in synchronism. The deflection rate for these beams may be the same as the pulse rate of the transmitted pulses and the generators 74 and 76 may be synchronized by a lead 77 from the pulse generator 11 as shown, or if preferred, a lower deflection rate may be employed.

The operation of the invention will be apparent from the foregoing description and from an inspection of the graphs in Fig. 2. The input signals applied during the first and second "put-on" intervals $T_1$ and $T_2$, respectively, are stored on the capacity elements of the storage screen 31 with complementary values, as shown by the graphs 78 and 79. During the second "put-on" interval, the pulses reflected from fixed targets arrive at the receiver, which is assumed to be stationary or substantially so, at a time following the instant of pulse transmission that is the same as their time of arrival during the first put-on period. Therefore, these pulses from stationary objects are stored on the same screen storage strips or elements during both "put-on" periods. The effect is that, as to stationary objects, the signals received during the two periods add on the storage elements so that they are brought to a common voltage level as shown by the graph 81 of Fig. 2.

As to a moving target, however, the "waiting" period is long enough so that the signals reflected from it are stored at different points on the screen 31 so that they do not cancel each other. Therefore, the moving target signal, and this signal only, appears in the storage tube output as illustrated by graph 81 of Fig. 2. The result is that the moving target signal is visible on the screen of the cathode ray tube 26 even though there may be enough reflected signals from fixed objects to mask it in the absence of cancellation or fixed target signals.

It will be understood that the actual duration of the several intervals in the cycle of operation, as well as their relative duration, will depend upon the use for which the apparatus is designed and upon various other factors. The specific timing indicated in Fig. 4 is given merely as one example of a suitable design for a pulse-echo system having about a 100 mile range and transmitting comparatively wide pulses such as pulses of 10 microseconds duration. In this example, the resolution of the system is about one mile and the waiting period has been made long enough, 36 seconds, to permit an airplane to travel about two miles, assuming its speed is about 200 miles per hour. During each "put-on" period of 9 seconds, the airplane will have time to travel only one-half mile. Since this is less than the one mile resolution of the system, the movement of the airplane will not appreciably affect the sharpness of the moving target indication.

I claim as my invention:

1. A radio system comprising a pulse transmitter for radiating radio pulses, a pulse-echo receiver, said receiver including means for receiving said pulses after they have been reflected from reflecting objects, and including a storage tube having a storage screen comprising storage elements, means for storing said reflected pulses on said storage screen on certain of said storage elements at points along a time axis thereon which correspond to the distances of the reflecting objects, means for preventing received reflected pulses from being stored during a waiting period that is substantially longer than the duration of each of said pulses, means for receiving pulses reflected from said objects after said waiting period and for storing them on said screen at points along a time axis thereon which correspond to the distances of the reflecting objects and with the storage being on said certain storage elements when the reflected pulses are from stationary objects, and means for balancing the later received pulses against said stored pulses whereby the pulses reflected from moving objects are substantially the only pulses that are not balanced out.

2. In a radio locator receiver for a system of the type having a radio transmitter that transmits radio signals toward reflecting objects, a storage device for storing electrical signals, said device including a storage screen comprising storage elements, means for receiving said radio signals after they have been reflected from said reflecting objects, means for storing received signals on said storage screen on certain of said storage elements during a certain time interval and at points along a time axis thereon which correspond to the distances of the reflecting objects, means for again storing received signals on said storage screen but with reversed polarity after a waiting interval and at points along a time axis thereon which correspond to the distances of the reflecting objects and with the storage being on said certain storage elements when the reflected pulses are from stationary objects whereby the signals reflected from stationary objects are substantially balanced out in said storage device, and means for taking signal off said storage device at the end of the storage of the reversed polarity pulses to obtain an indication of moving objects only.

3. In a pulse-echo receiver for a system of the type having a radio pulse transmitter that transmits radio pulses toward reflecting objects, a storage device for storing received pulses that have been reflected from said reflecting objects, said device including a storage screen comprising storage elements, means for storing said pulses on said storage screen during successive spaced time intervals that are long compared with the pulse period with the polarity of the pulses applied to said device during one interval opposite that of the pulses applied to said device during the next successive interval and at points along a time axis on said storage screen which correspond to the distances of the reflecting objects, said last means including means for storing said pulses on the same storage elements during two successive intervals when the pulses are being reflected from stationary objects, and means for taking signal off said storage device at the end of two successive intervals to obtain an output signal whereby the signals reflected from stationary objects are substantially balanced out and whereby only signals reflected from moving objects are included in said output signal.

4. In a pulse-echo receiver for a system of the type having a radio pulse transmitter that transmits radio pulses toward reflecting objects, a cathode-ray storage tube of the type comprising a storage screen having capacitive storage elements, means for receiving pulses after they have been reflected from said reflecting objects, means for storing received pulses on said storage screen on certain of said storage elements during a certain time interval and at points along a time axis thereon which correspond to the distances of the reflecting objects, means for again storing received pulses on said screen but with reversed polarity after a waiting interval and at points along a time axis thereon which correspond to the distances of the reflecting objects and with the storage being on said certain storage elements when the reflected pulses are from stationary objects whereby the pulses reflected from stationary objects are substantially balanced out on said storage screen, and means for taking signal off said screen at the end of the storage of the reversed polarity pulses to obtain an indication of moving objects only.

5. In a receiver for a pulse-echo radio locator system of the type having a radio pulse transmitter for transmitting electrical pulses toward reflecting objects, a cathode-ray storage tube of the type comprising a storage screen having capacitive storage elements, means for receiving said electrical pulses after they have been reflected from said reflecting objects, means for storing a plurality of received pulses on said storage screen on certain of said storage elements during a storage time interval and at points along a time axis thereon which correspond to the distances of the reflecting objects, means for again storing a plurality of received pulses on said screen during a second storage time interval but with reversed polarity after a waiting interval which is longer than either of said storage time intervals and at points along a time axis thereon which correspond to the distances of the reflecting objects and with the storage being on said certain storage elements when the reflected pulses are from stationary objects whereby the signals reflected from stationary objects are substantially balanced out on said storage screen, and means for taking signal off said screen at the end of the storage of the reversed polarity pulses to obtain an indication of moving objects only.

6. In a receiver for a pulse-echo radio locator system of the type having a radio pulse transmitter for transmitting electrical pulses toward reflecting objects, a cathode-ray storage tube of the type comprising a storage screen having capacitive storage elements, means for receiving said electrical pulses after they have been reflected from said reflecting objects, means for storing during a storage time interval a plurality of received pulses on certain of the capacitive storage elements of said storage screen along a time axis thereon at points which correspond to the distances of the reflecting objects, means for storing during a second storage time interval and after a waiting interval which is longer than either of said storage time intervals a plurality of received pulses on the capacitive storage elements of said screen along a time axis thereon at points which correspond to the distances of the reflecting objects but which are reversed in polarity and with the storage being on said certain storage elements when the reflected pulses are from stationary objects whereby the signals reflected from stationary objects are substantially balanced out on said storage screen, and means for taking signal off said screen at the end of the storage of the reversed polarity pulses to obtain an indication of moving objects only.

7. In a pulse-echo system that includes a receiver having a storage tube comprising a storage screen having storage elements, the method of reception which comprises receiving pulses that have been reflected from reflecting objects, storing the pulses that are received during a certain time interval on certain of said storage elements at points along a time axis on said screen which correspond to the distances of the reflecting objects, waiting for a time longer than said certain time interval without storing pulses, and again storing on said screen pulses that are received during a certain time interval and at points along a time axis thereon which correspond to the distances of the reflecting objects but with the polarity of the pulses reversed for balancing them against the first stored pulses and wth the storage being on said certain storage elements when the reflected pulses are from stationary objects whereby pulses reflected from moving objects are substantially the only pulses that are not balanced out.

8. In a receiver for a pulse-echo radio locator system of the type having a radio pulse transmitter for transmitting electrical pulses toward reflecting objects, a cathode-ray storage tube of the type comprising a storage screen having capacitive storage elements, said tube having an electron gun for producing a put-on beam and an electron gun for producing a take-off beam, means for deflecting said beams, means for receiving said electrical pulses after they have been reflected from said reflecting objects, means for intensity modulating the put-on beam in a direction to increase the beam current to store a plurality of received pulses on certain of said storage elements of said storage screen during a storage time interval at points along a time axis thereon which correspond to the distances of the reflecting objects, means for intensity modulating the put-on beam in a direction to decrease the beam current to store a plurality of received pulses on said screen during another storage time interval at points along a time axis thereon which correspond to the distances of the reflecting objects and with the storage being on said certain storage elements when the received pulses are from stationary objects, said two storage time intervals being separated by a waiting interval, means for biasing the put-on beam gun substantially to beam current cut-off during the storage interval during which the modulation increases the beam current, means for biasing the put-on beam gun to make the put-on beam current approximately one-half maximum beam current during the other storage time interval, means for biasing the put-on beam gun substantially to beam current cut-off during said waiting interval, means for blocking said take-off beam during said put-on and waiting intervals, means for blocking said put-on beam at the end of the second put-on period, and means for simultaneously unblocking said take-off beam and taking signal off said screen to obtain an indication of moving objects only.

9. In a receiver for a pulse-echo radio locator system of the type having a radio pulse transmitter for transmitting electrical pulses toward reflecting objects, a cathode-ray storage tube of the type comprising a storage screen having capacitive storage elements, said tube having an electron gun for producing a put-on beam and an electron gun for producing a take-off beam, means for deflecting said beams, means for receiving said electrical pulses after they have been reflected from said reflecting objects, means for intensity modulating the put-on beam in a direction to increase the beam current to store a plurality of received pulses on certain of said storage elements of said storage screen during a storage time interval at points along a time axis thereon which correspond to the distances of the reflecting objects, means for intensity modulating the put-on beam in a direction to decrease the beam current after a waiting interval to store a plurality of received pulses on said screen during a second storage time interval at points along a time axis thereon which correspond to the distances of the reflecting objects and with the storage being on said certain storage elements when the received pulses are from stationary objects, means for biasing the put-on beam gun substantially to beam current cut-off during said first storage interval, means for biasing the put-on beam gun to make the put-on beam current approximately one-half maximum beam current during said second storage time interval, means for biasing the put-on beam gun substantially to beam current cut-off during said waiting interval, means for blocking said take-off beam during said put-on and waiting intervals, means for blocking said put-on beam at the end of the second put-on period, and means for simultaneously unblocking said take-off beam and taking signal off said screen to obtain an indication of moving objects only.

RALPH S. HOLMES.

REFERENCES CITED

The following references are of record in the file of this patent:

UNITED STATES PATENTS

| Number | Name | Date |
| --- | --- | --- |
| 2,208,349 | Ulbricht | July 16, 1940 |
| 2,430,038 | Wertz | Nov. 4, 1947 |